Figure 1:
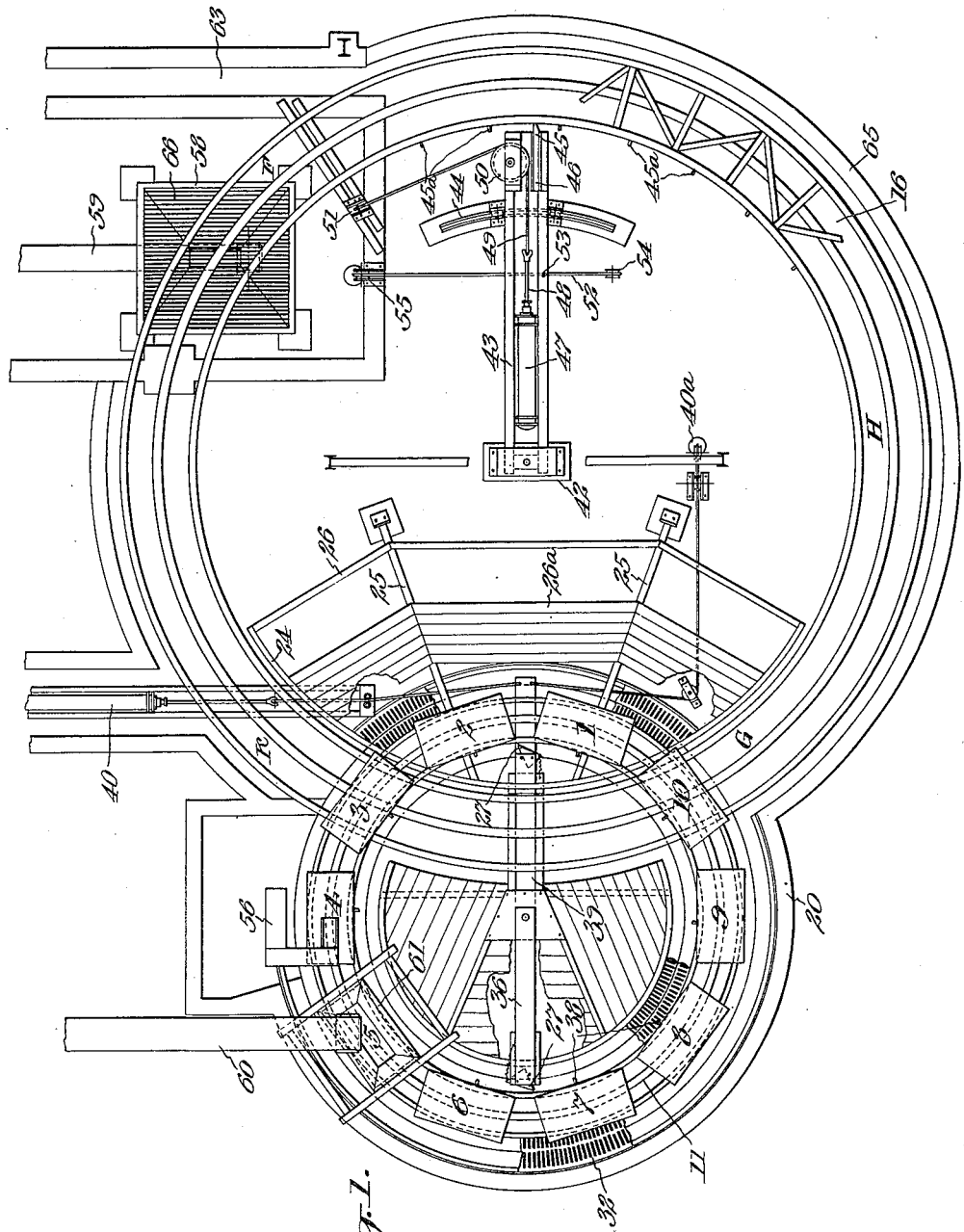

March 30, 1926.

E. C. REED ET AL 1,579,145

MOLDING AND CASTING PLANT

Filed March 6, 1925

2 Sheets-Sheet 1

Inventors
Earle C. Reed,
Howard C. Reed,
By Byrnes, Townsend & Brickenstein
Attorneys

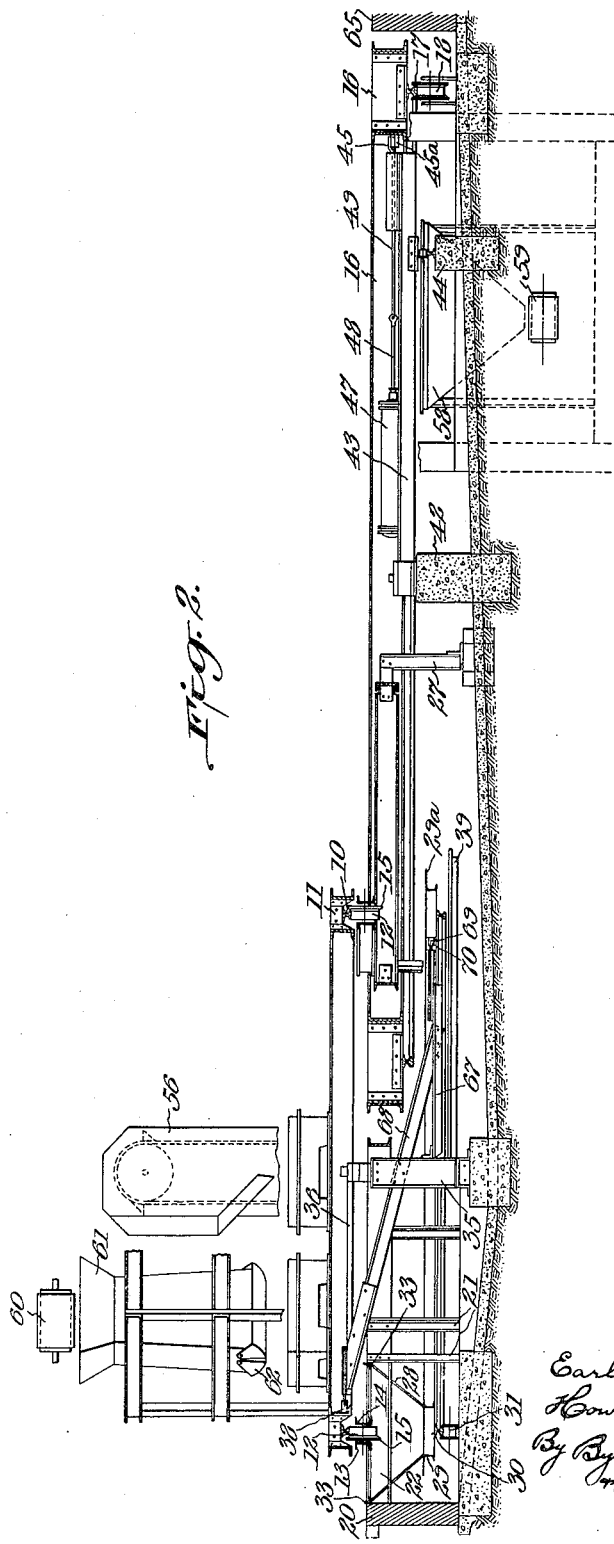

Patented Mar. 30, 1926.

1,579,145

UNITED STATES PATENT OFFICE.

EARLE C. REED AND HOWARD C. REED, OF DUNKIRK, NEW YORK, ASSIGNORS TO CONTINENTAL HEATER CORPORATION, OF DUNKIRK, NEW YORK, A CORPORATION OF NEW YORK.

MOLDING AND CASTING PLANT.

Application filed March 6, 1925. Serial No. 13,622.

*To all whom it may concern:*

Be it known that we, (1) EARLE C. REED and (2) HOWARD C. REED, citizens of the United States, residing at Dunkirk, in the county of Chautauqua and State of New York, have invented certain new and useful Improvements in Molding and Casting Plants, of which the following is a specification.

This invention relates to an improvement in molding and casting plants of the type in which the operations of molding and casting are carried out in conjunction with carriers or conveyors for advancing the patterns, the flasks, the molds and the castings from one station to another whereby the molding and casting operations may be considerably expedited.

The principal object of our invention is a combination of conveyors whereby the different operations of molding and casting may be carried out in cyclic order with greater facility than was heretofore possible.

Briefly expressed, the broader objects of the invention are accomplished by providing principally two conveyor systems intersecting each other so that it is possible to readily transfer parts from one to the other. The preferred embodiment of the invention are two endless conveyor systems so disposed that a part of each lies within the confines of the other whereby two intersecting points are established at which parts may be transferred from one conveyor to the other.

Other objects of the invention will more fully appear from the description in connection with the accompanying drawings and the specifically novel features will be particularly pointed out in the claims.

In the drawings:

Fig. 1 is a more or less diagrammatical representation in plan view of an arrangement embodying the invention; and Fig. 2 is a vertical section thereof.

10 represents a circular rail carrying a circular platform 11. The rail is supported at intervals upon wheels 12 pivotally mounted upon circular concentric frames 13 and 14. Provisions are made whereby the rail 10 is kept in position upon the wheels 12, as for instance as shown in Fig. 2, where a disk 15 is shown associated with a wheel 12. The disks 15 are disposed outwardly from the wheels and cooperate to hold the rail in place.

In a plane below that of platform 11 is supported a second larger circular platform 16 upon a circular rail 17 which in turn is supported upon a circular series of flanged wheels 18. As indicated in plan view in Fig. 1, the two rails and platforms are in overlapping relation in the sense that a portion of platform 11 lies within the confines of platform 16, while a portion of platform 16 lies within the platform 11. The arrangement is generally such that both platforms may be continuously moved relatively to each other without interference.

The platform 11, as will be more fully pointed out, serves the purpose to carry a number of patterns from which molds are made and will be hereinafter referred to as the "pattern conveyor", while the platform 16, which serves the purpose to carry completed molds, will be referred to as the "mold conveyor".

The construction so far described represents in substance two rings movable about fixed centers without the use of spokes or central bearings. This arrangement thus affords space inside the conveyors permitting men standing inside the circular paths thereof to take part in the operations to be performed.

The frames 13 and 14 upon which the wheels 12 are mounted are supported upon a circular frame work including a circular outer wall 20, posts 21, cross-pieces 22 and suitable braces. The wheels 12 which support that portion of the platform 11 that lies within the confines of the platform 16 are supported upon a frame work composed of circular part 24 concentric with the platform 16, beams 25 converging toward the center of the platform 11 and interconnecting beams 26 carried upon posts 27. The specific form of this support is not material to the invention and may be provided in any other suitable manner.

Below the platform 11 is disposed a circular spillway for the sand, including circular aprons 28 converging from points laterally of the platform 11 downwardly to a circular conveyor 29 mounted upon a circular rail 30 which is supported upon a circular series of flanged wheels or rollers 31. The aprons 28 and the frame work supporting the platform 11 form in effect a unitary construction. The aprons 28 extend completely around the platform 11 except for the necessary breaks at the points of intersection between platforms 11 and 16.

The conveyor 29 preferably consists of a flat circular plate reinforced by two circular channels which carry on their bottom flanges, cross-bars which rest on the circular rail 30.

The spillway is covered by grating 32 on both sides of the platform 11 as indicated in Fig. 1. The grating rests upon the supporting flanges 33 along the wall 20 and the posts 21 and the frames 13 and 14 which are preferably channel rails, the lower flanges of which are in the same plane as the flanges 33. This grating thus allows the sand to fall into the conveyor 29 and at the same time affords a platform for the workmen to stand on.

The frame work 24, 25 and 26 as well as frame work inside the platform 11 is covered by a plank floor for the same purpose.

The platforms 11 and 16 may be turned in any suitable way and by any suitable means. However, the motion is preferably intermittent so that both the platform 11 and the platform 16 are at rest during definite periods sufficient to carry out the operations that are to be successively performed at different places along the circular paths, as will be more particularly referred to later on. While there is considerable latitude in respect to the selection of means for effecting intermittent motion, I have found the mechanism disclosed in the drawings very satisfactory.

In the center of the platform 11 is a post 35 upon the upper end of which is pivotally mounted an arm 36 provided at one or preferably both ends with spring latches 27. The platform is provided at its inner periphery with a plurality of lugs 38 adapted to be engaged by the spring latches. The arm 36 is oscillated through the required angle corresponding to the angle defined by the spacing of the lugs which in turn is dictated by the number of stops required during one revolution to carry out the necessary operations upon the platform 11. The movement of the arm 36 is effected by means of an arm 39 engaging the post 35 near its lower end and below the plane of the conveyor 29 and extending preferably in the direction of the line between the centers of the platforms 11 and 16 under the overlapping portions of the latter. From the free end of the arm 39 two ropes extend in opposite directions, one being connected to a pneumatic pressure device 40 or any motor means operable to exert a pull on the arm while the other rope carries a counterweight 40ª tending to pull the arm in the opposite direction. When the pressure on the piston of the pneumatic device is released, the weight pulls the arm back into its initial position. The range of movement of the pressure device and the return mechanism is of course so adjusted as to cause the requisite angular movement of the arm. Upon the return stroke, the latches will snap over two diametrically opposite lugs and come to rest immediately behind them. Upon the forward stroke the latches will bear against the lugs and carry the platform with them through the predetermined angle.

Upon a post 42 in the center of the platform 16 is pivotally mounted an arm 43 which has near its free end an arcuate sliding support 44. From the end of the arm projects a latch 45 adapted to engage lugs 45ª similar to the lugs 38. When the arm is moved in one direction the latch will slide over the lugs while it will bear against the lugs when the arm is moved in the opposite direction. The latch might be similar to the latches 37 or might have any of many well known forms. For the sake of illustration the latch 45 is pivoted on a pin 46 and has an inclined edge adapted to allow the latch to ride over the lugs 45 in one direction and to bear against as abutments in the other direction.

Upon the arm 43 is mounted a pneumatic device 47 to the piston 48 of which is attached a rope 49 passing over a sheave 50 near the end of the arm substantially at right angle thereto to an anchoring point point 51. When the piston is caused to move inwardly, the arm is pulled toward the anchoring point 51. A rope 52 passing from a point 53 of the arm in opposite direction over a sheave 54 and then in a lower flight over a sheave 55 carrying a weight at its end, returns the arm 43 to its initial position when the pressure on the piston is released.

The mechanisms just described for intermittently moving the arms 39 and 43 have no special significance except in so far as they serve to carry out the objects of the invention.

The operation is as follows:

Both platforms are moved in counter-clockwise direction. Upon the platform 11 are shown a plurality of patterns. As the pattern conveyor moves intermittently, work is done during each period of rest. All patterns advance simultaneously and each pattern after its arrival at its next station undergoes additional work until it arrives at the final station 10, the places at which the patterns successively come to rest being marked for the sake of convenience 1—10. At the final station 10 a completed half mold is ready for removal; these half-molds being alternately cope and drag.

The operations performed at the successive stations are as follows:

Patterns coming to rest at station 1 are cleaned and at stations 1 and 2 the chaplets are set. At station 3 an empty flask is placed upon the pattern from a pile of flasks on the mold conveyor, which pile has been conveyed close to the pattern in a manner to be described. At station 4 the flask receives molding sand from a vertical bucket elevator 56 which elevates the sand from a boot into which it has been carried by the spillage sand conveyor 29 which constantly collects the sand which has dropped from the various stations and conveys it to this boot. At station 5 the flask receives additional sand from a sand preparation equipment (not shown). At stations 6 and 7 the operations of peining and ramming the sand are performed; at stations 8 and 9 the excess sand is struck off and any remaining work performed which is necessary to complete the half-mold. At station 10 the completed half-mold—cope or drag—is removed from the pattern and laid down upon the mold conveyor. As is apparent from the drawings, the transfer from the pattern conveyor to the mold conveyor is a very simple operation.

The molding conveyor has four stations at which operations are performed. At the station G the molds are completed. After laying down a drag, a core is set, and the cope which follows the drag on the pattern conveyor is laid down and the mold completed.

We prefer to place completed molds in superposition to form stacks. After one stack is formed, the mold conveyor is moved forward one step whereby a vacant space is brought to the station G. Thus the mold conveyor will be moved a step forward every time a stack is completed. As the stacks successively reach the station H, the molten metal is poured into the molds. At the station F the molds are ready to be shaken out. The distance from station H to station F is so chosen that the castings are given sufficient time to gradually cool off. At F, which is the shake-out station, the molding sand falls directly through the mold conveyor which is of open construction and the castings are removed from the molds as the shaking-out proceeds. The molding sand is collected in a hopper 58 below the conveyor from which it is removed by a conveyor 59 to machinery (not shown) which prepares it for further use and delivers it to station 5 of the pattern conveyor by means of a conveyor 60 through a hopper 61 from which the sand may be withdrawn at will through gate 62. Adjacent station F is preferably provided with a side track 63 or suitable conveyor system for removing the castings.

The empty flasks are piled up in stacks on the mold conveyor on the other side of the station F so that stacks of empty flasks are successively delivered at station K where they are transferred to the pattern conveyor as needed. In practice each stack contains the same number of flasks as that required for a stack of molds. During the operation, the space between the station G and the station H is occupied by stacks of completed molds ready for pouring; the space between stations H and F is occupied by stacks of molds which have been poured; and the space between stations F and K is occupied by stacks of empty flasks.

The mold conveyor or platform 16 is surrounded by a wall 65 the upper end of which is substantially on the same level as the platform 16 and forms part of a platform for the workmen to do work upon the conveyor. The hopper 58 is covered by a grate 66 which allows the sand to fall into the hopper and at the same time affords a place to stand on.

The spillage sand conveyor 29 is operated by the mechanism for operating the pattern conveyor. An arm 67 is connected to the post 35 above the arm 39. A brace 68 interconnects the arms 36, 39 and 67. This brace, being also connected to the post 35, gives support to the outer end of arm 36 and supports both the arms 39 and 67. The conveyor 39 has lugs 69 which are the same in number as the lugs 38 and the arm 67 has a latch 70 which may be like the latches 37 or of any other suitable construction.

In the foregoing we have described what we consider at present as a preferred embodiment of our invention. Much of the detail may be modified in various ways without affecting the essentials of the invention. While we have shown and described two circular conveyors in overlapping relation and while such embodiment of the invention has certain advantages, the advantages resulting from the invention are by no means limited to that form. The essential feature is the intersecting relation of the two conveyor systems whereby the various phases of the molding and casting operations and the operations auxiliary thereto may be correlated in such a way as to reduce the energy, work, space and costs to an irreducible minimum.

We claim:

1. In a casting plant of the type in which the various molding and casting steps are performed at different stations, the combination with an endless pattern conveyor operable to move patterns and flasks past the several stations at which the mold sections are completed and the patterns are cleaned, of an endless mold conveyor operable to carry completed molds past pouring and shake-out stations, said mold conveyor branching from said pattern conveyor adjacent the mold-section completing station and returning thereto at a point past the pattern cleaning station.

2. In a casting plant of the type in which the various molding and casting steps are performed at different stations, the combination with an endless conveyor for advancing patterns and flasks during the mold forming steps, of an endless mold conveyor adapted to advance the completed mold-sections past the pouring and shake-out stations, the pattern conveyor having a section overlapping a portion of said mold conveyor.

3. In a casting plant of the type in which the various molding and casting steps are performed at different stations, the combination with a substantially horizontal pattern conveyor for advancing the patterns and mold-sections during the mold forming operation, of a substantially horizontal mold conveyor having a section underlying a portion of said pattern conveyor, said mold conveyor being adapted to carry the completed molds past the pouring and shake-out stations.

4. In a casting plant, an endless conveyor, a platform extending along said conveyor and provided with apertures therethrough for the escape of sand falling from said conveyor, and a spillage sand conveyor underlying the entire length of said endless conveyor.

5. In a casting plant, the combination of two endless conveyors in overlapping relation, each conveyor including a circular rail, a circular series of wheels supporting the rail on the wheels and means associated with the wheels for maintaining the rails in operative position on the respective series of wheels.

6. In a casting plant, the combination of an endless pattern conveyor, an endless mold conveyor in a plane below the plane of the pattern conveyor in partly overlapping relation thereto and a spillage sand conveyor in a plane below the mold conveyor and in vertical alignment with the pattern conveyor.

7. Apparatus according to claim 6, including aprons converging from points laterally of the pattern conveyor toward the sand conveyor, grates above the aprons defining platforms surrounding the pattern conveyor and a platform within the confines of the mold conveyor, surrounding that portion of the pattern conveyor which lies within the confines of the mold conveyor.

In testimony whereof we affix our signatures.

EARLE C. REED.
HOWARD C. REED.